(12) United States Patent
Marti et al.

(10) Patent No.: US 10,296,018 B2
(45) Date of Patent: May 21, 2019

(54) PSEUDO FORCE DEVICE

(71) Applicant: Harman International Industries, Incorporated, Stamford, CT (US)

(72) Inventors: Stefan Marti, Oakland, CA (US); Davide Di Censo, Oakland, CA (US); Jaime Elliot Nahman, Oakland, CA (US); Mirjana Spasojevic, Palo Alto, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 301 days.

(21) Appl. No.: 15/191,271

(22) Filed: Jun. 23, 2016

(65) Prior Publication Data

US 2017/0371358 A1 Dec. 28, 2017

(51) Int. Cl.
| | | |
|---|---|---|
| *G06F 3/01* | (2006.01) | |
| *G05D 15/01* | (2006.01) | |
| *A61H 1/00* | (2006.01) | |
| *G05B 15/02* | (2006.01) | |

(52) U.S. Cl.
CPC ............. G05D 15/01 (2013.01); A61H 1/008 (2013.01); G05B 15/02 (2013.01); G06F 3/012 (2013.01); G06F 3/016 (2013.01)

(58) Field of Classification Search
CPC .......... G05D 1/005; G05D 3/00; G05D 13/00; G06F 3/016
USPC ..................... 715/701, 702; 701/487; 700/63
See application file for complete search history.

(56) References Cited

U.S. PATENT DOCUMENTS

| | | | | |
|---|---|---|---|---|
| 9,802,225 | B2 * | 10/2017 | Houston | B06B 1/16 |
| 2007/0091063 | A1 * | 4/2007 | Nakamura | G06F 3/016 |
| | | | | 345/156 |
| 2009/0076723 | A1 * | 3/2009 | Moloney | G01C 21/3652 |
| | | | | 701/472 |
| 2010/0033030 | A1 | 2/2010 | Anemiya et al. | |
| 2010/0103135 | A1 | 4/2010 | Sugahara | |

OTHER PUBLICATIONS

Rekimoto, J. "Traxion: A Tactile Interaction Device with Virtual Force Sensation" UIST'13, Oct. 6-9, 2013, St. Andrews, United Kingdom. Copyright c 2013 ACM 978-1-4503-2271-3/13/10 http://lab.rekimoto.org/projects/traxion/.

(Continued)

*Primary Examiner* — Walter F Briney, III
(74) *Attorney, Agent, or Firm* — Artegis Law Group, LLP

(57) ABSTRACT

A system for exerting forces on a user. The system includes a user-mounted device having one or more masses disposed along one or more tracks. The system further includes a processor configured to generate a first actuator control signal to configure a first actuator to move a first mass included in the one or more masses at a first acceleration in a first direction along a first track included in the one or more tracks. The processor is further configured to generate a second actuator control signal to configure at least one of the first actuator and a second actuator to move the first mass at a second acceleration in the first direction along the first track. A magnitude of the first acceleration is above a threshold acceleration, and a magnitude of the second acceleration is below the threshold acceleration.

20 Claims, 12 Drawing Sheets

(56) References Cited

OTHER PUBLICATIONS

Amemiya, T., Ando, H., & Maeda, T. (Dec. 2005). Phantom-DRAWN: direction guidance using rapid and asymmetric acceleration weighted by nonlinearity of perception. In Proceedings of the 2005 international conference on Augmented tele-existence (pp. 201-208). ACM. http://www.ic-at.org/papers/2005/full164.pdf.
Amemiya, T., Ando, H., & Maeda, T. (Mar. 2005). Virtual force display: Direction guidance using asymmetric acceleration via periodic translational motion. In First Joint Eurohaptics Conference and Symposium on Haptic Interfaces for Virtual Environment and Teleoperator Systems. World Haptics Conference (pp. 619-622). IEEE. http://ieeexplore.ieee.org/xpl/login.jsp?tp=&arnumber=1407031.
Amemiya, T., et al. "Lead-Me Interface: Buru-Navi" ACM Trans. Applied Perception, 5(3), 15, 1-17, 2008. http://www.orl.ntt.co.jp/people/t-amemiya/research.html.
Extended European Search Report for EP Application No. 17171200.3, dated Oct. 19, 2017, 7 pages.

\* cited by examiner

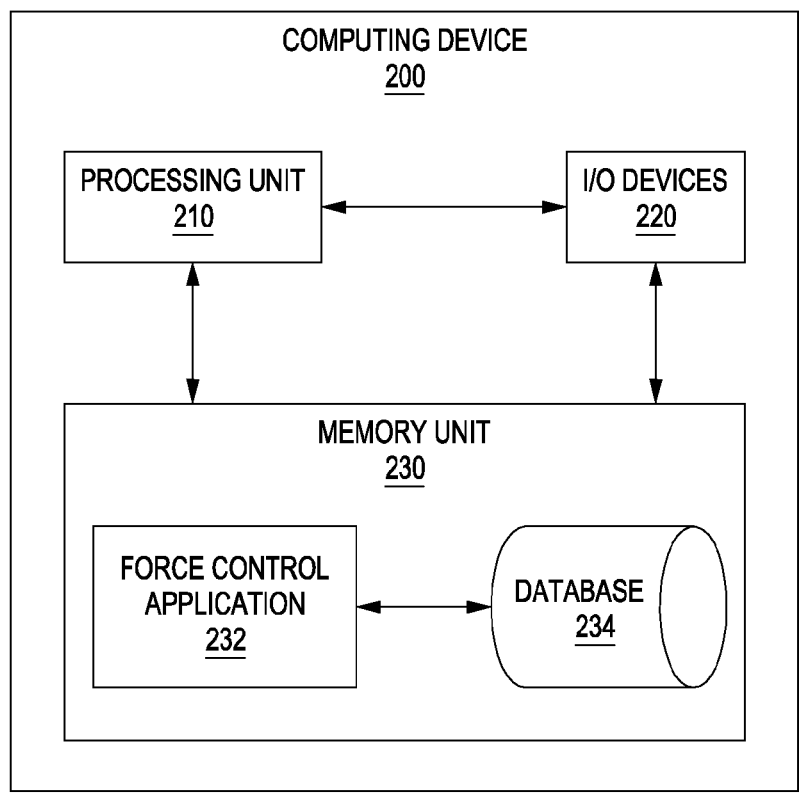
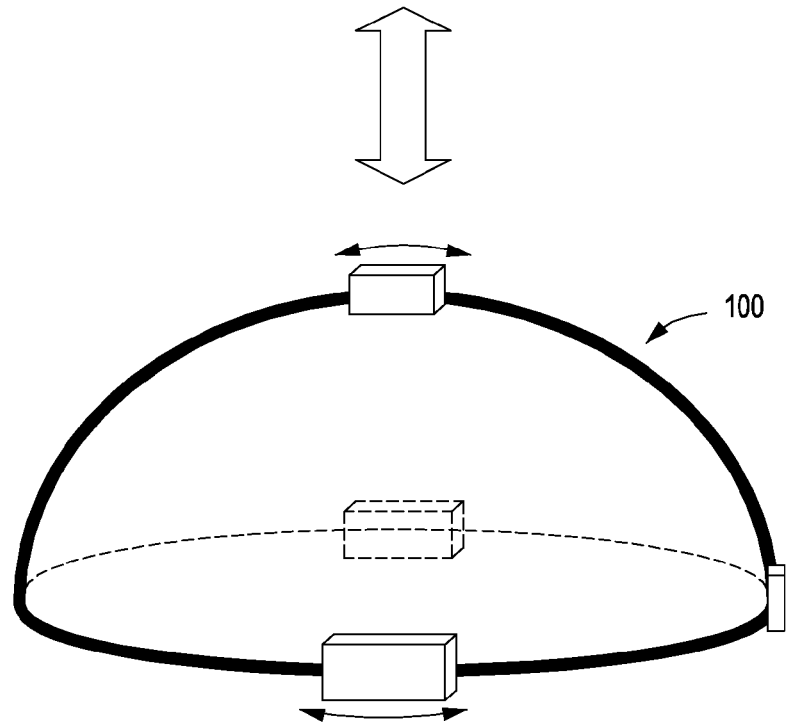
FIG. 2

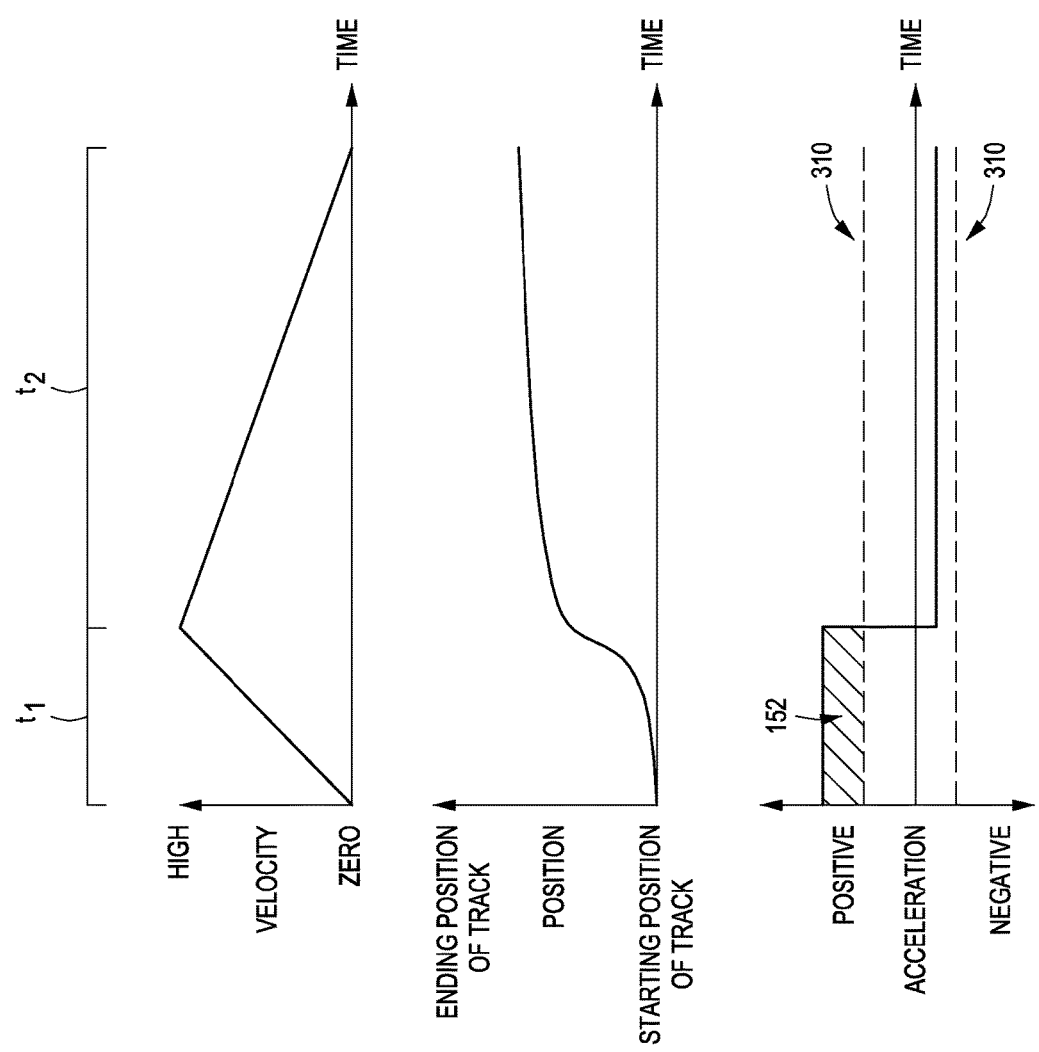

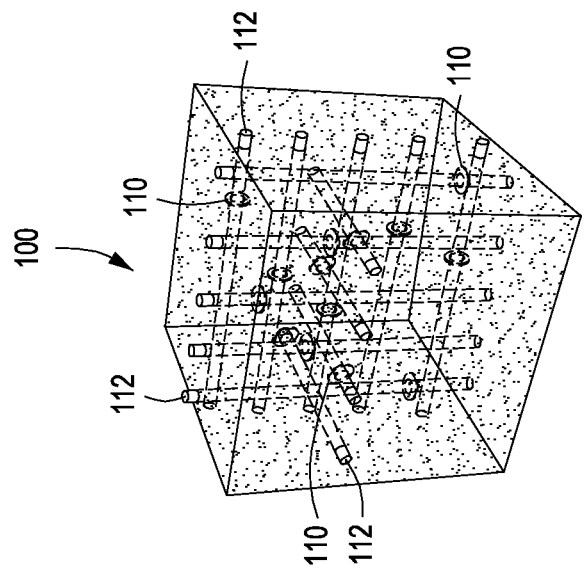
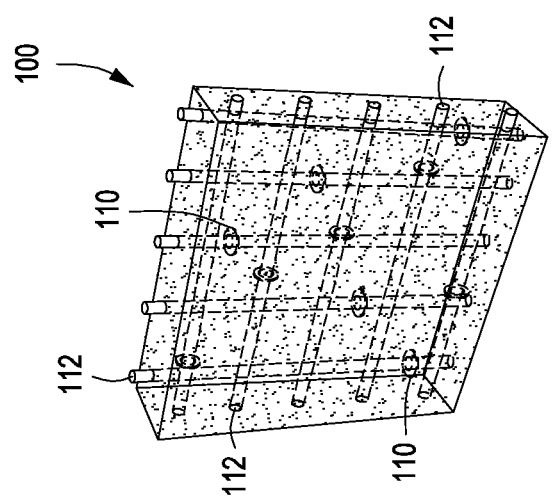
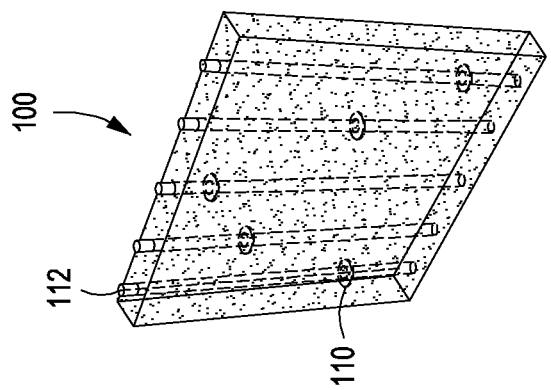
FIG. 6C
FIG. 6B
FIG. 6A

PSEUDO FORCE DEVICE

BACKGROUND

Field of the Embodiments

The various embodiments relate generally to human-machine interfaces and, more specifically, to a pseudo force device.

Description of the Related Art

One problem with many electronic devices is the reliance on traditional output mechanisms. In particular, conventional mobile devices and wearable devices typically rely on visual feedback via a screen and/or auditory feedback via one or more speakers to convey information to a user. For example, mobile phones typically provide navigation instructions by displaying a graphical map to a user and sometimes supplementing the graphical map with auditory navigation instructions.

However, while visual and auditory feedback often are effective in conveying detailed information to a user, in certain situations, the visual and/or auditory channels of a particular user may become information-saturated. In such situations, the user is typically unable to receive any additional information via his or her visual and/or auditory channels. For example, when a user is communicating via e-mail or text messages, or when the user is engaged in a voice-oriented conversation, the visual and/or auditory channels of the user may be unable to effectively receive and process additional visual and/or auditory information, such as the visual and/or auditory navigation instructions described above. Consequently, when additional visual and/or auditory information is presented to the user, the information may be either ignored by the user or inaccurately perceived by the user.

Further, in some situations, overwhelming a user with additional visual and/or auditory information may distract the user, creating a potentially dangerous situation. For example, when a user is driving a vehicle or navigating on foot, requiring the user to look down at a screen to view navigation instructions requires the user to divert his/her attention away from the act of driving, walking, running, etc. Such diversions reduce the ability of the user to safely avoid obstacles in the surrounding environment, potentially compromising the safety of both the user and those in the surrounding environment.

As the foregoing illustrates, non-visual and non-auditory techniques for providing information to a user would be useful.

SUMMARY

Embodiments of the present disclosure set forth a method for exerting forces on a user. The method includes generating a first actuator control signal to configure a first actuator to move a first mass at a first acceleration in a first direction along a first track. The method further includes generating a second actuator control signal to configure at least one of the first actuator and a second actuator to move the first mass at a second acceleration in the first direction along the first track. A magnitude of the first acceleration is above a threshold acceleration, and a magnitude of the second acceleration is below the threshold acceleration.

Further embodiments provide, among other things, a system and a non-transitory computer-readable storage medium configured to implement the techniques set forth above.

At least one advantage of the techniques described herein is that non-visual and non-auditory information can be provided to a user, thereby preventing the visual and/or auditory channels of the user from being overwhelmed with information. Accordingly, the user can receive instructions, alerts, and notifications via the techniques described herein, while simultaneously receiving other types of information via his or her visual and/or auditory channels, without creating potentially dangerous situations.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIG. 2 is a block diagram of a computing device that may be implemented in conjunction with or coupled to the force device of FIGS. 1A-1D, according to various embodiments;

FIG. 3 illustrates a technique for asymmetrically accelerating a mass to exert a pseudo force on a user, according to various embodiments;

FIGS. 6A-6C illustrate different configurations for a series of tracks and masses that could be implemented within a force device, according to various embodiments;

DETAILED DESCRIPTION

Figure 1A:
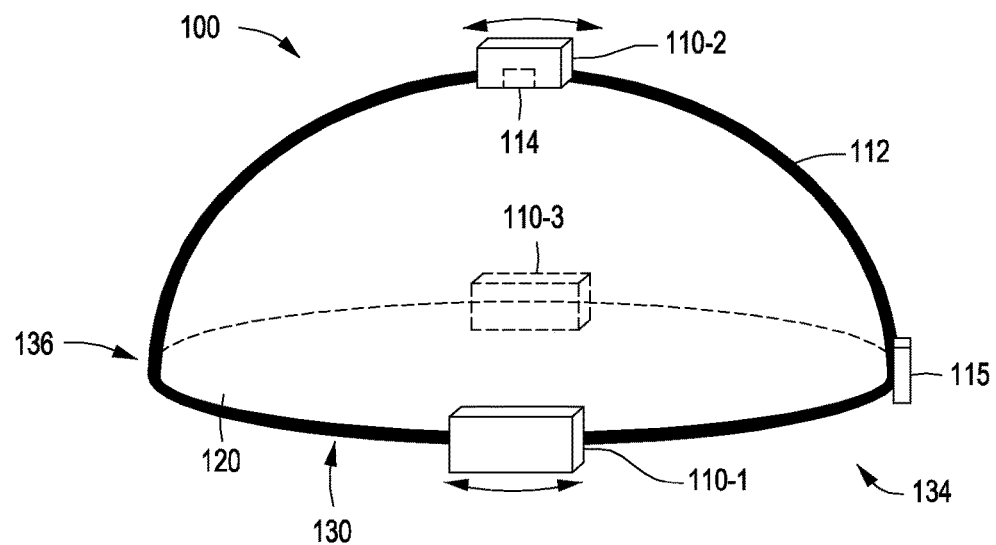
FIGS. 1A-1D illustrate a force device for exerting forces on a user, according to various embodiments.
Figure 1B:
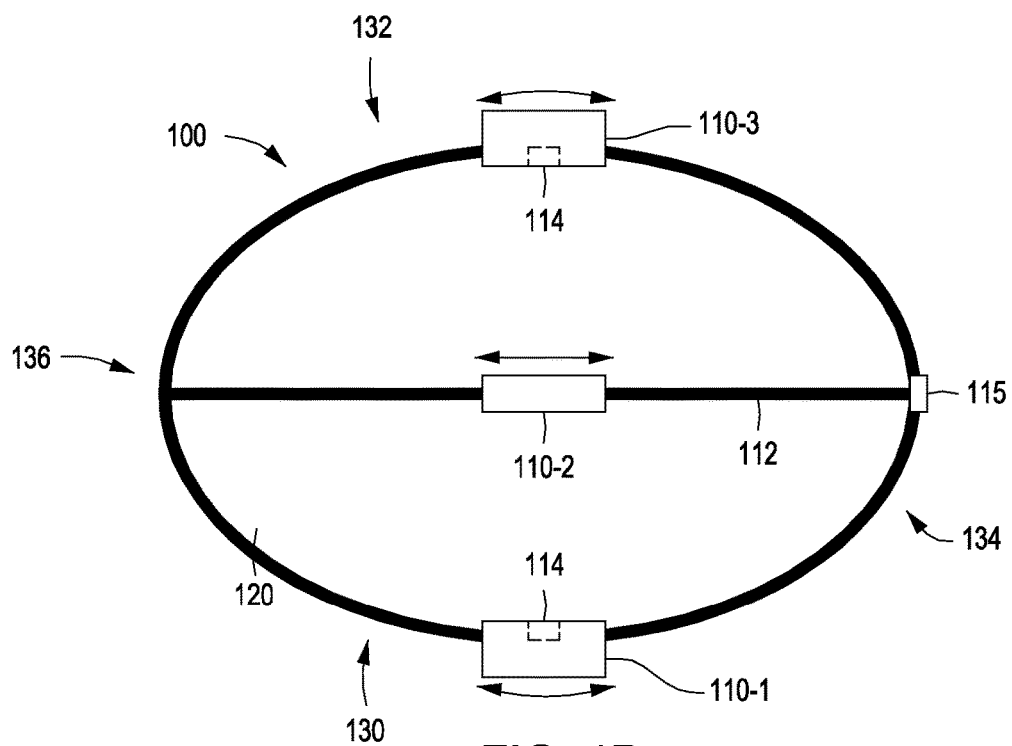
Figure 1C:
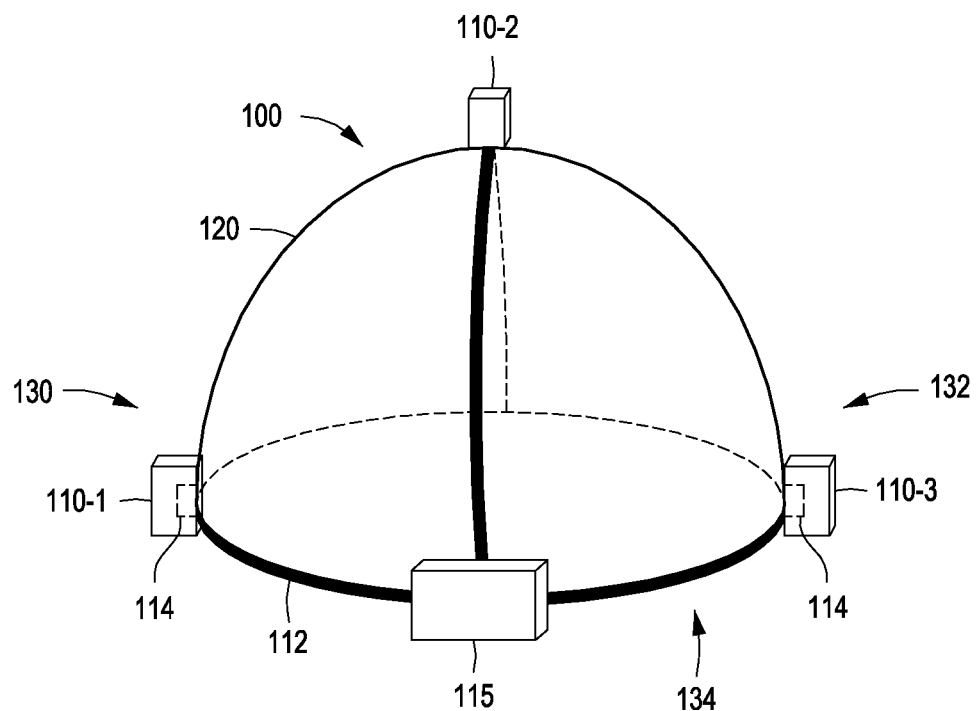

In the following description, numerous specific details are set forth to provide a more thorough understanding of the embodiments of the present disclosure. However, it will be apparent to one of skill in the art that the embodiments of the present disclosure may be practiced without one or more of these specific details.

FIGS. 1A-1D illustrate a force device 100 for exerting forces on a user, according to various embodiments. The force device 100 may include, without limitation, one or more masses 110, one or more tracks 112, one or more force control modules 115, and a head support 120. The force device 100 generates forces on the user, for example, and without limitation, by moving the masses 110 along the tracks 112 at various speeds and accelerations.

In some embodiments, the masses 110 exert forces on the user based on force events that are received and/or generated by the force device 100. For example, and without limitation, a force event received by the force device 100 could specify a type of force (e.g., a linear force, a rotational force, etc.) to be exerted on a user via the masses 110, a direction in which a force is to be exerted, and/or a magnitude of a force to be exerted. In addition, a force event may specify the time at which exertion of a force is to be initiated and/or terminated, a duration of time for which a force is to be exerted, and/or the position and/or orientation of the force device 100 at which the exertion of a force is to be initiated and/or terminated.

In general, force events are intended to communicate various types of information to a user. For example, and without limitation, force events could be generated to communicate navigation instructions to a user, to provide the user with information associated with objects in the surrounding environment, and to provide the user with alert information, such as when someone is attempting to contact the user or when the user is potentially in danger. Additionally, in some embodiments, force events could be generated to communicate other types of information to a user, such as subconsciously perceived feedback (e.g., leading to user interfaces that require only partial attention from a user), information intended to instruct a user to correct his or her balance or posture (via a user's vestibular sense), and information intended to cancel out various types of involuntary user movements (e.g., stereotypy).

Figure 1D:
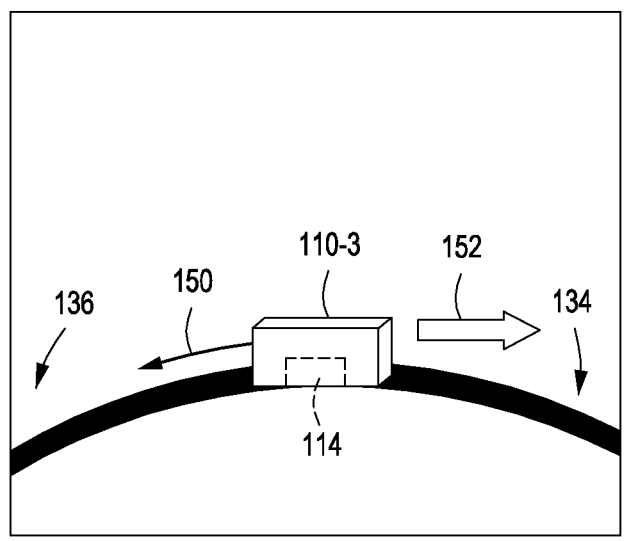

The force control module 115 is configured to receive sensor data, move the masses 110, and coordinate the overall operation of the force device 100. In general, the force control module 115 operates actuators 114 coupled to the masses 110 and/or to the tracks 112 to asymmetrically accelerate the masses 110 relative to the force device 100. Accelerating the masses 110 at various rates with respect to the force device 100 produces forces on a user's head and/or body. For example, and without limitation, as shown in FIG. 1D, the force device 100 could generate a pseudo force 152 on the user by moving mass 110-3 quickly from a starting position (e.g., at the front 134 of the force device 100) in a first direction 150 along a track 112 at an acceleration having a magnitude that is above a minimum acceleration perceivable by the user. Then, prior to reaching an ending position of the track 112 (e.g., at the rear 136 of the force device 100), the force device 100 could reduce the acceleration of the mass 110 to a second acceleration (e.g., a negative acceleration) having a magnitude that is below the minimum acceleration perceivable by the user. In such an embodiment, the user would perceive a force associated with accelerating the mass 110 from the starting position, but the user would not perceive the force associated with decelerating the mass 110 prior to the mass reaching the ending position. Thus, by leveraging asymmetric acceleration, pseudo forces can be generated by the force device 100 to convey non-visual, non-auditory output to a user.

The exertion of pseudo forces (also referred to as "fictitious forces") on a user may serve a variety of purposes. In some embodiments, forces are exerted on a user to indicate that the user should look or move in a particular direction or to draw the user's attention to a particular object or location in the environment. In other embodiments, the force device 100 could exert pseudo forces on a user to alert the user of a dangerous situation, such as when a vehicle is approaching the user from a certain direction at a high rate of speed. In addition, a series of pseudo forces could be exerted on the user by repeatedly accelerating one or more masses 110 in an asymmetric manner, for example, and without limitation, to indicate that the user has taken a wrong turn or is in a dangerous situation.

In yet another non-limiting example, pseudo forces could be exerted on a user to simulate specific actions or experiences, such as when a user is interacting with a virtual reality device. In still another non-limiting example, a pseudo force or pseudo force pattern could be used to provide a notification to a user, such as a notification that the user is receiving an incoming phone call. Additionally, a gentle tapping force pattern could be used to provide a more subtle notification—akin to being tapped on the shoulder—such as when a user is listening to music via headphones, and one or more sensors determine that someone is attempting to speak to the user or get the user's attention. Accordingly, the force device 100 enables alternate forms of feedback, directional information, and notifications to be generated for a user.

In various embodiments, a forward force may be generated by the force device 100 in order to instruct the user to move in a forward direction, to direct the user's interest towards an object located in front of the user, and/or to simulate an action or experience in which the head of the user would be pushed or pulled forward. For example, and without limitation, the force device 100 could generate a pseudo force in a forward direction by moving mass 110-1 and mass 110-3 quickly towards the rear 136 of the force device 100 at an acceleration that is above the minimum acceleration perceivable by the user and then decelerating the masses 110-1, 110-3 slowly before reaching the rear 136 of the force device 100, in order to avoid creating a force of a similar magnitude in the opposite direction. In addition, the magnitude of the forward force may be increased by also moving mass 110-2 towards the front 134 of the force device 100 and/or by increasing the magnitude of the initial acceleration of one or more of the masses 110. In some embodiments, the magnitude of the forward force may indicate the distance for which the user should move in a forward direction, the importance of an object located in front of the user, or the degree to which the action or experience, such as gravity or another type of acceleration, would push or pull the head of the user.

Further, the force device 100 could generate a pseudo force in a backward direction by moving mass 110-1 and mass 110-3 (and optionally mass 110-2) quickly towards the front 134 of the force device 100 at an acceleration that is above the minimum acceleration perceivable by the user and then decelerating the masses 110-1, 110-3 slowly before reaching the front 134 of the force device 100. In various embodiments, a backward force may be generated by the force device 100 in order to instruct the user to step backwards, to instruct the user to turn 180°, to direct the user's interest towards an object located behind the user, and/or to simulate an action or experience in which the head of the user would be pushed or pulled backwards. Further, the magnitude of the backward force may indicate the distance for which the user should move in a backward direction (e.g., by turning 180° and walking forward), the importance of an object located behind the user, or the degree to which the action or experience would push or pull the head of the user backwards. In some embodiments, the magnitude of the forward force or the backward force may be based on a magnitude of movement required for the user to correct his or her posture, such as the distance a user should move his or her shoulders and/or back to properly align the spine of the user.

Additionally, the force device 100 could generate a rotational pseudo force in a clockwise direction by moving mass 110-1 towards the front 134 of the force device 100 and moving mass 110-3 towards the rear 136 of the force device 100 at accelerations that are above the minimum acceleration perceivable by the user. The force device 100 could then decelerate the masses 110-1, 110-3 slowly before reaching the front 134 and rear 136 of the force device 100, respectively, in order to avoid creating forces of a similar magnitude in the opposite direction. In various embodiments, clockwise and counterclockwise rotational forces may be generated by the force device 100 in order to instruct the user to navigate to the left or to the right, to direct the user's interest towards an object located to the left or to the right of the user, and/or to simulate an action or experience in which the head of the user would be rotated to the left or to the right. In some embodiments, the magnitude of the rotational forces may indicate how many degrees the user should turn to the left or to the right, the importance of an object located to the left or to the right of the user, or the degree to which the action or experience would rotate the head of the user to the left or to the right.

In some embodiments, the force device 100 may exert a pseudo force having a magnitude intended to affect the head of the user or a pseudo force having a larger magnitude that is intended to affect the overall balance of the user, thereby causing the body of the user to move in a specific direction. For example, and without limitation, whereas a relatively small force affects only the head of the user, a larger force may influence the user's entire body. In the first technique, the user may perceive a slight force to their head and interpret the force as a hint to direct their attention towards a certain direction. By contrast, in the second technique, the user may perceive a force that is applied to the head as instead being applied to their entire body (e.g., due to lateral flexion of the neck or spine) and interpret the force as an instruction to walk or navigate in a certain direction.

Once a force has been exerted on the user, the force control module 115 may monitor the sensors and reposition of the masses 110, as needed, to exert additional forces on the user. For example, after exerting a pseudo force on the user with a particular mass 110, that mass may be returned to a starting position on a track 112 by moving the mass 110 at an acceleration that is below the minimum acceleration perceivable by the user. Then, once the exertion of forces is complete (e.g., once the user has reached a desired position and/or orientation), the force control module 115 may return the masses 110 to a neutral position.

Although the masses 110 illustrated in FIGS. 1A-1D, 2, 4A, 4B, 6A-6C, 7A, and 7B are solid weights, in other embodiments, the force device 100 may include any other technically feasible type of mass that is capable of being accelerated to exert forces on a user. Further, although the masses 110 described herein are shown as being moved to specific positions on the force device 100 via tracks 112, in other embodiments, the masses 110 may be moved to other positions on the force device 100 via other techniques. Additionally, in some embodiments, a greater (e.g., 4 or more) or lesser (e.g., 1 or 2) number of masses 110 may be coupled to the force device 100 at one or more different positions and selectively moved to exert various types of singular or cumulative forces on the user. Examples of alternate types of masses 110, alternate placement of masses 110 on the force device 100, and alternate techniques for accelerating masses 110 to exert pseudo forces on a user are described below in conjunction with FIGS. 4A-9.

In various embodiments, the force device 100 includes one or more sensors that track the position and/or orientation of the force device 100 and/or track various aspects of the surrounding environment. The sensor(s) may include, without limitation, global navigation satellite system (GNSS) devices, magnetometers, inertial sensors, gyroscopes, accelerometers, visible light sensors, thermal imaging sensors, laser based devices, ultrasonic sensors, infrared sensors, radar sensors, and/or depth sensors, such as time-of-flight sensors, structured light sensors, etc. These sensor(s) may enable the position of the force device 100 to be tracked in absolute coordinates (e.g., GPS coordinates) and/or relative to objects in the surrounding environment.

In some embodiments, the sensor(s) are disposed in the force control module(s) 115. Data acquired by the sensor(s) could then be used to generate force events within the force device 100 or the sensor data may be transmitted to a separate device for analysis. In the same or other embodiments, one or more of the sensors may be disposed within an auxiliary device, such as a smartphone, mobile computer, wearable device, etc.

Further, in various embodiments, the force device 100 includes one or more actuators 114 that reposition masses 110 associated with the force device 100. The actuator(s) 114 may include, without limitation, electric motors, piezoelectric motors, magnetic actuators, springs, hydraulic actuators, pneumatic actuators, pumps, etc. For example, and without limitation, with reference to FIGS. 1A-1D, the actuators 114 may include electric motors that are coupled to the tracks 112 and move along the length and/or width of the tracks 112 to reposition the masses 110. In other embodiments, one or more springs may be disposed along one or more of the tracks 112 and/or coupled to one or more of the masses 110 in order to accelerate and/or decelerate the mass(es) 110, enabling the mass(es) 110 to travel between a starting position and an ending position more efficiently. For example, and without limitation, a first spring could be positioned near a starting position of each track 112 in order to accelerate a mass 110 and/or a second spring could be positioned near an ending position of each track 112 in order to decelerate the mass 110 and/or return the mass 110 to the starting position. Further, in some embodiments, one or more magnets (e.g., electromagnets or permanent magnets) could be disposed at a starting position, an ending position, or at any location in between the starting position and ending position in order to accelerate a mass 110 towards an ending position, decelerate the mass 110, and/or return the mass 110 to the starting position. In general, the actuators 114 enable the masses 110 to be asymmetrically accelerated in order to exert pseudo forces on the user.

In some embodiments, the force control module 115 is configured to receive force events from other devices (e.g., a smartphone or mobile computer). Additionally, in some embodiments, the force control module 115 receives sensor data acquired via one or more sensors (not shown in FIGS. 1A-1D), generate force events based on sensor data, and generate control signals to move the one or more masses 110 to exert forces on the user. For example, and without limitation, when a force control module 115 receives a force event, the force control module 115 may query one or more sensors and calculate the necessary accelerations and/or positions at which to move one or more of the masses 110 to exert a force specified by the force event, given the current orientation and/or position of the user (e.g., the current orientation/position of the head of the user). The force control module 115 then moves the mass(es) 110, if applicable, by activating the corresponding actuators 114 to exert a force on the user along those vector(s).

FIG. 2 is a block diagram of a computing device 200 that may be implemented in conjunction with or coupled to the force device 100 of FIGS. 1A-1D, according to various embodiments. As shown, computing device 200 includes, without limitation, a processing unit 210, input/output (I/O) devices 220, and a memory device 230. Memory device 230 includes a force control application 232 configured to interact with a database 234.

Processing unit 210 may include a central processing unit (CPU), digital signal processing unit (DSP), and so forth. In various embodiments, the processing unit 210 is configured to analyze sensor data acquired by one or more sensors to determine the position and/or orientation of the force device 100, determine the position and/or orientation of the masses 110, and/or to detect and/or identify objects in the surrounding environment. In some embodiments, the processing unit 210 is further configured to determine the position and/or orientation of the force device 100 relative to the surrounding environment and/or to receive and/or generate force events that are based on the position and/or orientation of the force device 100 and/or objects in the surrounding environment. For example, and without limitation, the processing unit 210 could execute the force control application 232 to analyze sensor data, determine that the force device 100 has a particular orientation and position, and generate a force event intended to cause the user to modify the orientation and position by exerting force(s) on the user via the masses 110. The processing unit 210 could further generate control signals (e.g., via the force control application 232) that cause actuators 114 to move the masses 110 to exert forces on the user until the force device 100 reaches a desired orientation and/or position.

I/O devices 220 may include input devices, output devices, and devices capable of both receiving input and providing output. For example, and without limitation, I/O devices 220 may include wired and/or wireless communication devices that send data to and/or receive data from the sensor(s) included in the force device 100. Additionally, the I/O devices 220 may include one or more wired or wireless communication devices that receive force events (e.g., via a network, such as a local area network and/or the Internet) that cause the actuators 114 to move the masses 110. The I/O devices 220 may further include actuator controllers, such as a linear actuator controller.

Memory unit 230 may include a memory module or collection of memory modules. Force control application 232 within memory unit 230 may be executed by processing unit 210 to implement the overall functionality of the computing device 200, and, thus, to coordinate the operation of the force device 100 as a whole. The database 234 may store digital signal processing algorithms, navigation data, object recognition data, force event data, and the like.

Computing device 200 as a whole may be a microprocessor, an application-specific integrated circuit (ASIC), a system-on-a-chip (SoC), a mobile computing device such as a tablet computer or cell phone, a wearable device such as a smart watch or head mounted display, a VR/AR device such as video goggles, a media player, and so forth. In some embodiments, computing device 200 is integrated in the force control module(s) 115 associated with the force device 100. Generally, computing device 200 may be configured to coordinate the overall operation of the force device 100. In other embodiments, the computing device 200 may be coupled to, but separate from the force device 100. In such embodiments, the force device 100 may include a separate processor that receives data (e.g., force events) from and transmits data (e.g., sensor data) to the computing device 200, which may be included in a consumer electronic device, such as a smartphone, portable media player, personal computer, wearable device, and the like. However, the embodiments disclosed herein contemplate any technically feasible system configured to implement the functionality of the force device 100.

FIG. 3 illustrates a technique for asymmetrically accelerating a mass 110 to exert a pseudo force on a user, according to various embodiments. As discussed above, asymmetrically accelerating one or more masses 110 relative to the force device 100 produces forces on a user's head and/or body. In various embodiments, the asymmetric acceleration of a mass 110 may include an initial acceleration having a magnitude that is above a minimum acceleration that is perceivable by a user and a subsequent acceleration or deceleration having a magnitude that is below the minimum acceleration or deceleration that is perceivable by a user.

For example, and without limitation, as shown in FIG. 3, during a first period of time ($t_1$), the force device 100 could accelerate a mass 110 along a track at a rate that is above a minimum magnitude of acceleration 310 perceivable by the user. Consequently, during $t_1$, the user would perceive a force in a direction opposite the direction in which the mass 110 is being accelerated. Then, during a second period of time ($t_2$), the force device 100 could decelerate the mass 110 at a rate that is below the minimum magnitude of acceleration or deceleration 310 perceivable by the user. As a result, during $t_2$, the user would not perceive the slight force that is being exerted in the direction in which the mass 110 is moving.

Alternatively, a mass 110 could be asymmetrically accelerated with an initial acceleration having a magnitude that is below the minimum magnitude of acceleration 310 perceivable by the user and a subsequent deceleration having a magnitude that is above the minimum magnitude of acceleration or deceleration 310 perceivable by the user. In still other embodiments, a mass 110 could be accelerated at three or more different rates when traveling between a starting position of a track 112 and an ending position of the track 112. For example, and without limitation, a mass 110 could alternate between one or more accelerations that are above the minimum magnitude of acceleration 310 and one or more accelerations that are below the minimum magnitude of acceleration 310 when traveling from a starting position of a track 112 and an ending position of the track 112. Further, similar techniques for asymmetrically accelerating a mass 110 could be implemented when returning the mass 110 to the starting position of the track 112. In addition, a continuous force could be exerted on the user by generating pseudo forces sequentially with multiple masses 110, as described below in further detail in conjunction with FIGS. 4A-9.

Figure 4A:
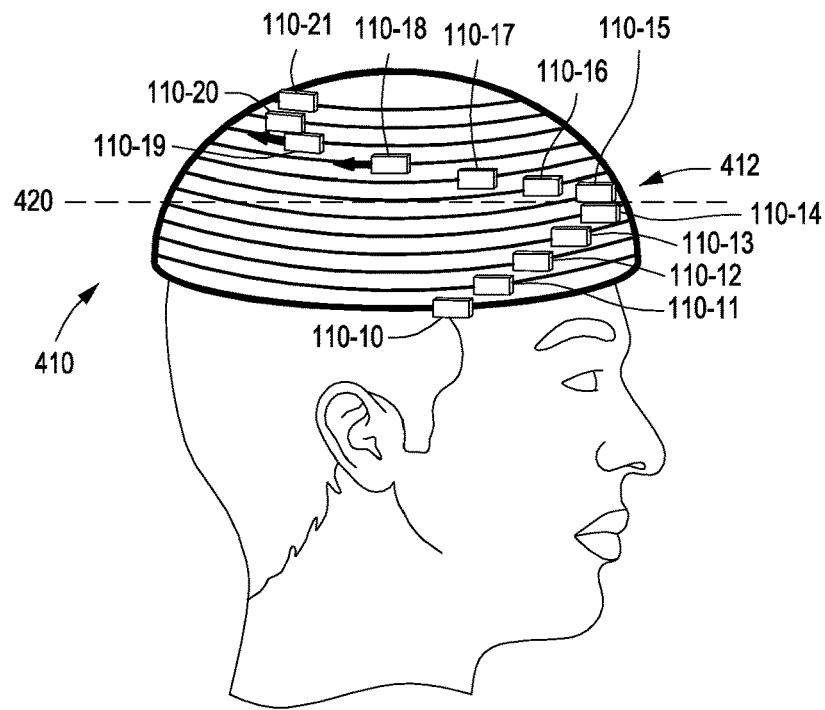
FIGS. 4A and 4B illustrate a force device for exerting continuous forces on a user, according to various embodiments.
Figure 4B:
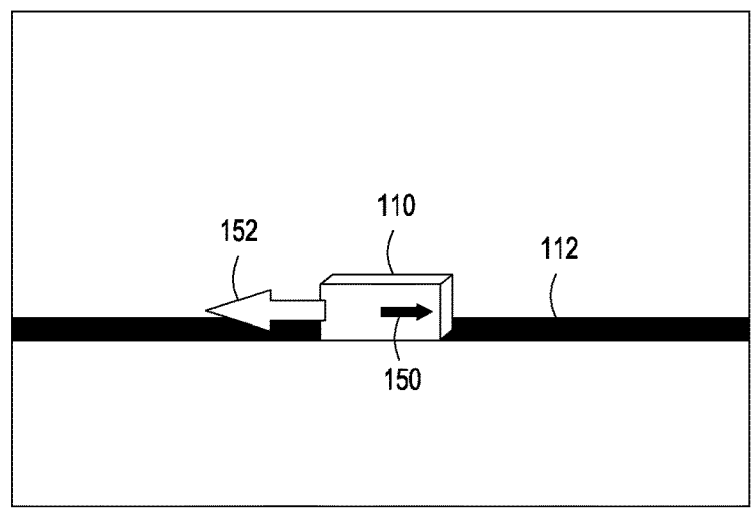

FIGS. 4A and 4B illustrate a force device 100 for exerting continuous forces on a user, according to various embodiments. As shown, the force device 100 includes multiple masses 110 that travel along multiple tracks 112. In operation, the force device 100 generates a continuous force on the user by asymmetrically accelerating the masses 110 along the tracks 112 at different phase offsets. More specifically, as described above, when a given mass 110 is asymmetrically accelerated in a particular direction 150 to exert a pseudo force 152 on a user, there will be a time period during which the magnitude of the acceleration of the mass 110 must remain below the minimum magnitude of acceleration 310 perceivable by the user, in order to avoid creating a perceivable force in a direction opposite of the pseudo force 152. Accordingly, in various embodiments, while a given mass 110 (e.g., mass 110-16) is being accelerated at a rate that is below the minimum magnitude of acceleration 310 perceivable by the user, one or more other masses 110 (e.g., mass 110-18 and mass 110-19) may be accelerated at a rate that is above the minimum magnitude of acceleration 310 perceivable by the user in order to exert a pseudo force on a user. When this technique is performed sequentially by asymmetrically accelerating multiple masses 110 with different phase offsets, a continuous, pseudo force is perceived by the user. One such embodiment is described in further detail below in conjunction with FIGS. 5A-5C.

Figure 5A:
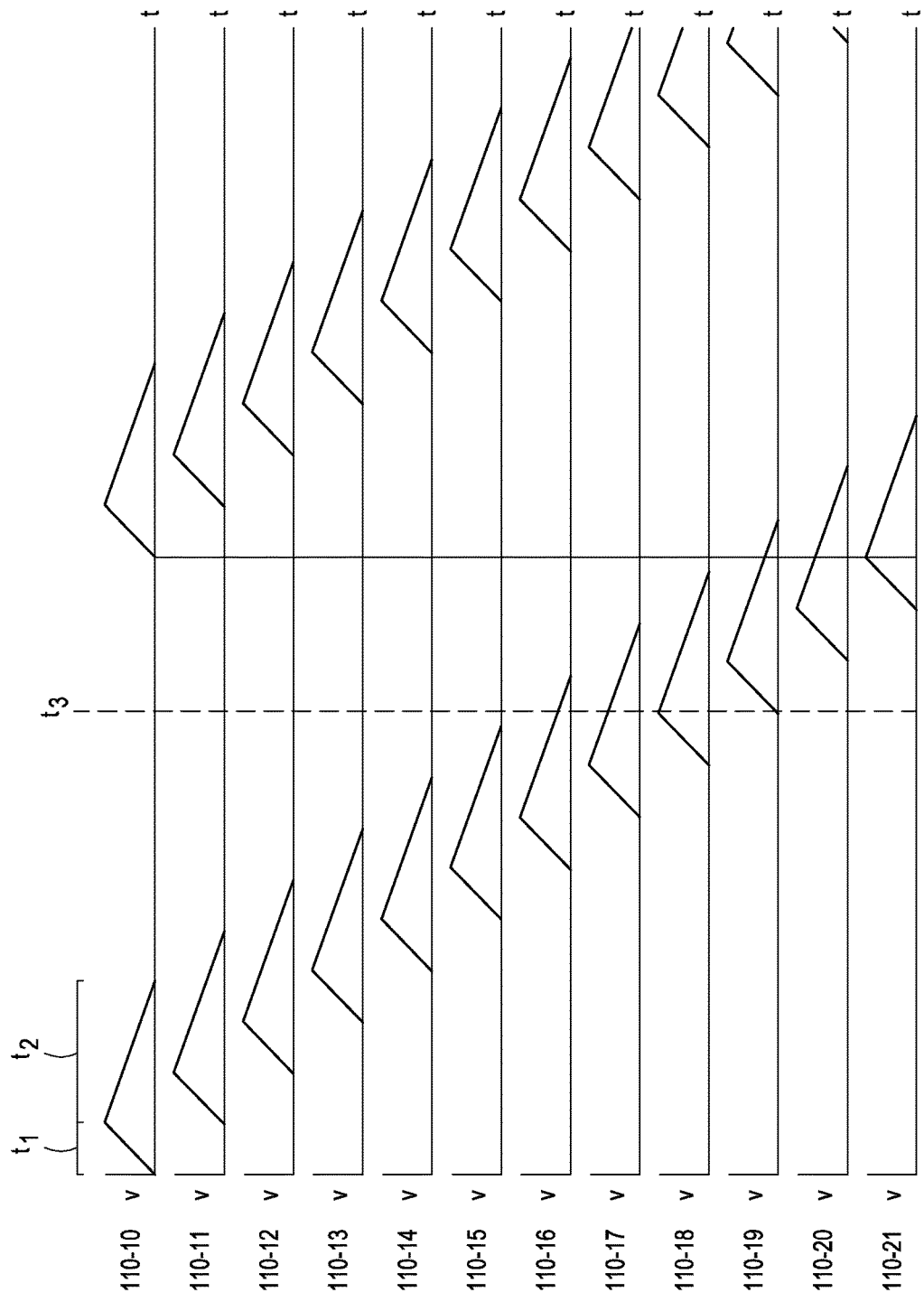
FIGS. 5A-5C illustrate techniques for asymmetrically accelerating the masses included in a force device to exert a continuous, pseudo force on a user, according to various embodiments.

FIG. 5A illustrates a technique for asymmetrically accelerating the masses 110 included in the force device 100 of FIG. 4A to exert a continuous pseudo force on a user, according to various embodiments. As shown, asymmetric accelerations may be applied to masses 110 disposed on parallel tracks 112 in a sequential manner. For example, and without limitation, each mass 110 may be accelerated at a rate that is above the minimum magnitude of acceleration 310 perceivable by the user during time period $t_1$ and decelerated at a rate that is below the minimum magnitude of acceleration 310 perceivable by the user during time period $t_2$.

In various embodiments, the time periods $t_1$ and $t_2$ associated with each mass 110 are phase shifted with respect to the time periods $t_1$ and $t_2$ associated other masses 110 included in the force device 100. For example, and without limitation, as shown in FIG. 5, the end of time period $t_1$ for a particular mass 110 (e.g., mass 110-10) may be substantially aligned with the start of time period $t_1$ for another mass 110 included in the force device 100 (e.g., mass 110-11). Further, in some embodiments, in order to ensure that a continuous force is perceived by the user of the force device 100, the time period $t_1$ for each mass 110 may overlap with the time period $t_1$ for one or more other masses 110. For example, as shown in FIGS. 4A and 5, at time $t_3$, both mass 110-18 and mass 110-19 are exerting a force 152 on the user due to a slight overlap between the time period $t_1$ associated with mass 110-18 and the time period $t_1$ associated with mass 110-19.

Figure 5B:
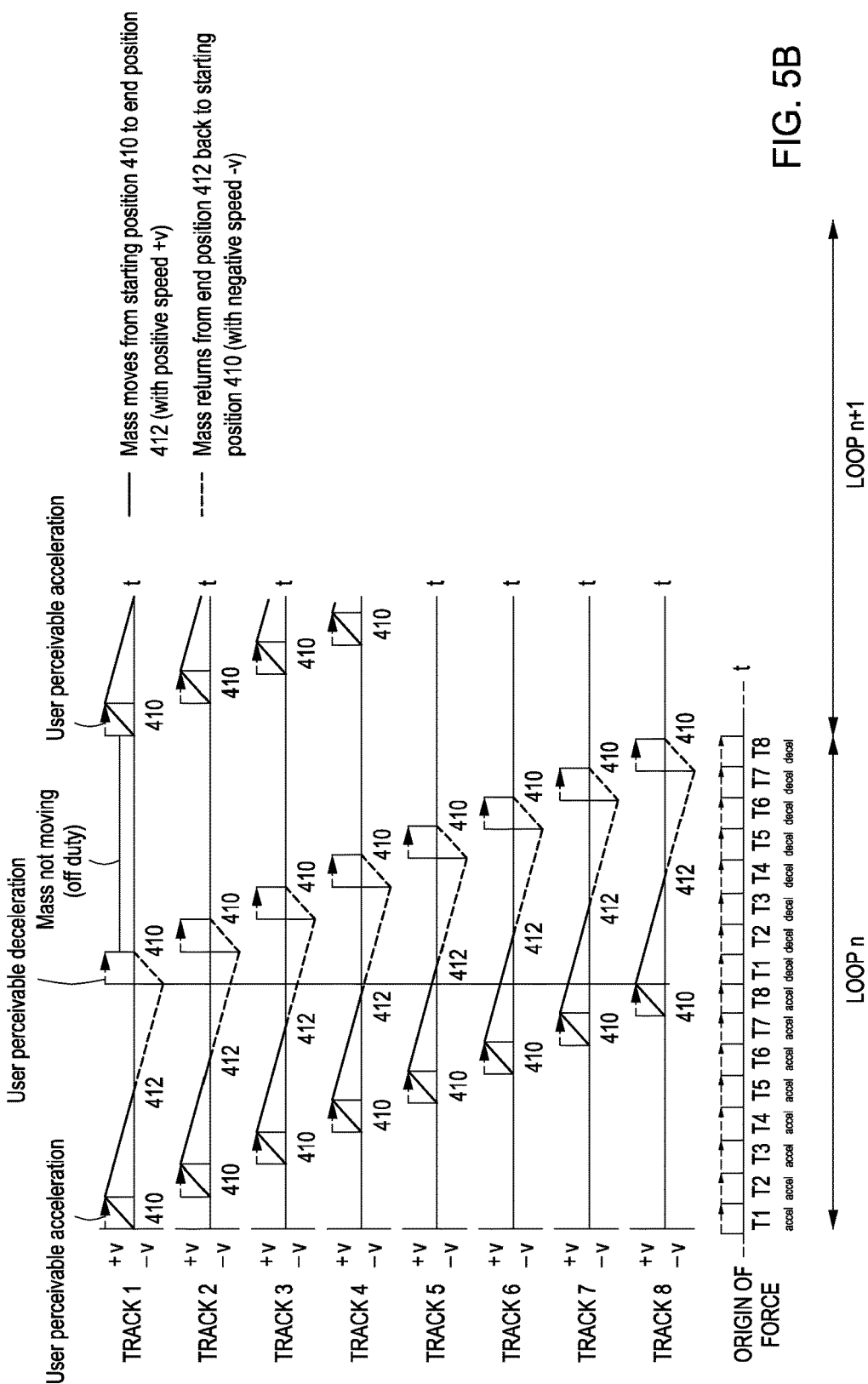
Figure 5C:
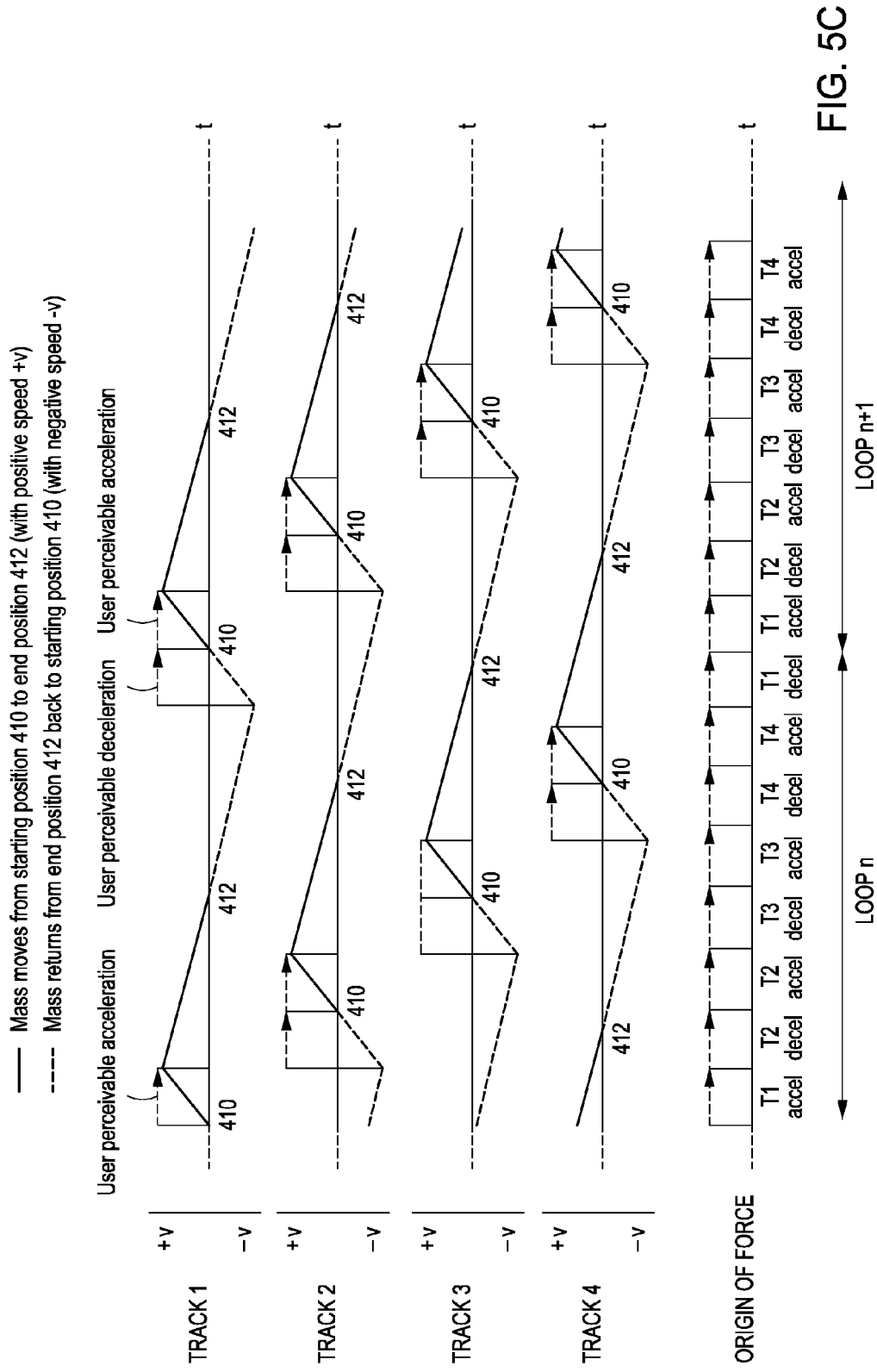

Additional techniques for asymmetrically accelerating the masses 110 included in other types of force devices 100 to exert a continuous pseudo force on a user are illustrated in FIGS. 5B and 5C. In particular, FIGS. 5B and 5C illustrate techniques that implement force devices having eight tracks 112 and four tracks 112, respectively. As shown, in various embodiments, masses 110 can be asymmetrically accelerated with an initial acceleration having a magnitude that is above the minimum magnitude of acceleration or deceleration 310 perceivable by the user and a subsequent deceleration having a magnitude that is also above the minimum magnitude of acceleration or deceleration 310 perceivable by the user. Accordingly, in such embodiments, both the acceleration and deceleration of a mass 110 may contribute to the continuous pseudo force exerted on the user.

In some embodiments, in order to exert a continuous, pseudo force along substantially the same axis while asymmetrically accelerating masses 110 in a sequential manner, two or more masses 110 may be asymmetrically accelerated simultaneously, in phase with one another. For example, and without limitation, with reference to FIG. 4A, in order to exert a continuous, pseudo force along an center axis 420 defined between the track 112 associated with mass 110-16 and the track 112 associated with mass 110-15, two masses 110 (e.g., mass 110-20 and mass 110-10, mass 110-19 and mass 110-11, mass 110-18 and mass 110-12, etc.) may be asymmetrically accelerated in phase. Accordingly, because each of the two masses being simultaneously accelerated are substantially the same distance from the center axis 420, the user will perceive a similar linear force (if the user perceivable parts of both accelerations are in the same direction) or torque (rotational) force (if the user perceivable parts of both accelerations are in opposing directions) being exerted by the force device 100 as the pairs of masses 110 are sequentially accelerated along the tracks 112.

For clarity, FIG. 5A illustrates the velocities of the masses 110 only during asymmetric acceleration from the starting position 410 to the ending position 412. In some embodiments, when returning each mass 110 to the starting position 410, the mass 110 is both accelerated and decelerated at a rate that is below the minimum magnitude of acceleration 310 perceivable by the user. In other embodiments, one or more of the masses 110 could be asymmetrically accelerated when moving the masses 110 from the ending position 412 back to the starting position 410. For example, and without limitation, each mass 110 could be accelerated from the ending position 412 at a rate that is below the minimum magnitude of acceleration 310 perceivable by the user and then decelerated at a rate that is above the minimum magnitude of acceleration 310 perceivable by the user in order to exert an additional pseudo force 152 on the user when returning the mass 110 to the starting position 410.

FIGS. 6A-6C illustrate different configurations for a series of tracks 112 and masses 110 that could be implemented within a force device 100, according to various embodiments. As shown in FIG. 6A, one or more masses 110 could be disposed on parallel tracks 112 in order to generate singular, periodic, and/or continuous pseudo forces along a particular axis. For example, and without limitation, one or more of the masses 110 associated with the force device 100 shown in FIG. 6A could be asymmetrically accelerated in a sequential manner to exert a continuous pseudo force on a user.

Alternatively, one or more of the tracks 112 along which the masses 110 travel could diverge from one another to enable the force device 100 to generate off-axis forces. For example, and without limitation, as shown in FIG. 6B, the force device 100 could include a first set of tracks 112 that is perpendicular to a second set of tracks 112, enabling off-axis forces (e.g., singular, periodic, and/or continuous forces) to be generated in any direction within a plane defined by the first set of tracks 112 and the second set of tracks 112. More specifically, a pseudo force could be generated along a first track 112 while simultaneously generating a pseudo force along a second, perpendicular track 112 such that the directions and magnitudes of the forces produce a net force that is off-axis from the first track 112 and the second track 112.

In another non-limiting example, the force device 100 could include a first set of tracks 112, a second set of tracks 112, and a third set of tracks 112, where each set of tracks 112 is perpendicular to the other two sets of tracks 112. In such embodiments, off-axis forces could be generated with six degrees of freedom (DoF): three translational, and three rotational. More specifically, pseudo forces could be simultaneously generated along three different tracks 112, where each track 112 is perpendicular to the other two tracks 112, such that the directions and magnitudes of the forces produce a net force that is off-axis from the first track 112, the second track 112, and the third track 112. Accordingly, in such embodiments, off-axis forces (e.g., singular, periodic, and/or continuous forces) could be generated in any direction, regardless of the orientation of the force device 100.

Such off-axis forces could be generated by the force device 100 in order to instruct the user to navigate in a more specific direction (e.g., a southeast (SE) direction, a north-northwest (NNW) direction, etc.), to direct the user's interest towards an object located in a specific direction relative to the user, to correct the posture of a user that is leaning towards a specific direction, and/or to simulate an action or experience in which a body part of the user would be pushed or pulled in a specific direction.

Figure 7A:
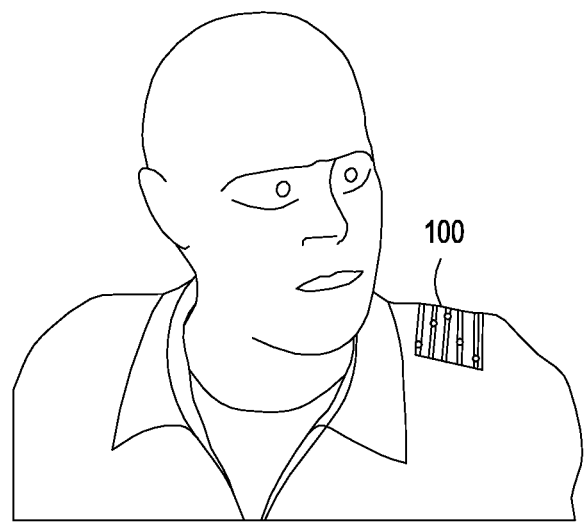
FIGS. 7A and 7B illustrate how the force devices of FIGS. 6A-6C can be mounted at different locations on a user, according to various embodiments.
Figure 7B:
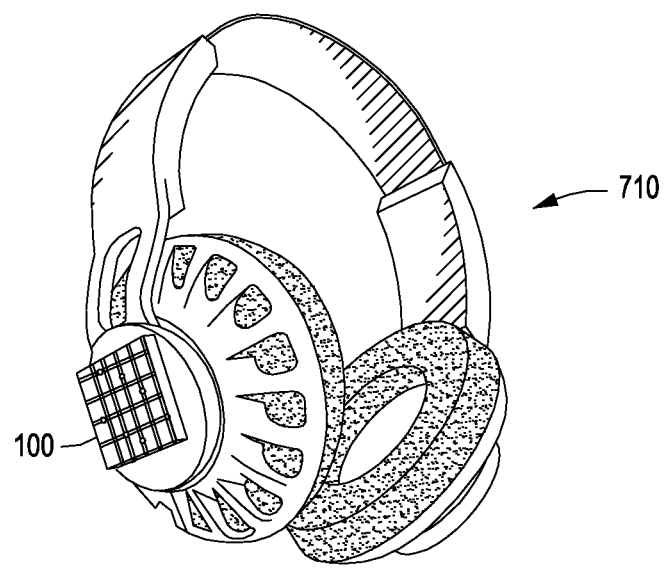

FIGS. 7A and 7B illustrate how the force devices 100 of FIGS. 6A-6C can be mounted at different locations on a user, according to various embodiments. Although various aspects of the force device 100 are described herein in conjunction with a head-mounted force device 100 (e.g., the head-mounted force devices 100 shown in FIGS. 1A-1C and 4), the descriptions and techniques provided herein are also applicable to other types of force devices 100 positioned at other locations on a user. For example, and without limitation, as shown in FIG. 7A, any type of force device 100 described herein (e.g., a force device 100 having one DoF, two DoF, or three DoF, etc.) could be a shoulder-mounted device that exerts forces on the upper torso of the user. More specifically, one or more force devices 100 could be coupled to one or both shoulders of the user, enabling singular, periodic, and/or continuous pseudo forces (e.g., linear forces, rotational forces, etc.) to be exerted on the shoulders of the user. In other embodiments, one or more force devices 100 could be coupled to the lower body of a user (e.g., the waist and/or leg) in order to exert any of the pseudo forces described herein on the lower body of the user.

Additionally, as shown in FIG. 7B, the force device 100 could be coupled to another type of device, such as a pair of headphones 710. In still other embodiments, the force device 100 could be integrated with clothing, jewelry, armbands, other types of wearables, handheld devices, pocket-sized devices, etc. in order to exert forces on a user's hand, arm, or other body part. For example, and without limitation, the force device 100 could be integrated with a watch (e.g., a smartwatch) and/or a watch band, enabling pseudo forces to be exerted on the wrist of the user. In another non-limiting example, the force device 100 could be integrated with a smartphone which senses that a user is approaching an intersection and, in response, creates a pseudo force towards a left side or right side of the smartphone to instruct the user to turn left or right at the intersection.

Additionally, multiple force devices 100 may be operated in conjunction with one another to exert forces in multiple directions, enabling a fuller range of force directions to be achieved. For example, and without limitation, a first force device 100 could provide forces along the x-axis on a first body part, while a second force device 100 exerts forces along the y-axis on a second body part. Moreover, even when implemented along the same axis/axes, multiple force devices 100 could be used to indicate the importance of an instruction, alert, or notification. For example, and without limitation, a force device 100 integrated with shoulder pads could exert a subtle force notification to the shoulders of a user, a force device 100 integrated with a head-worn device could exert a more significant force notification to the head of the user, and both force devices 100 could exert forces when a notification is of importance.

FIGS. 8A-8D illustrate a technique for providing navigational instructions to a user via a force device 100, according to various embodiments. As described above, the force device 100 may include one or more sensors capable of tracking the position and/or orientation of the force device 100 and/or tracking various aspects of the surrounding environment. In some embodiments, the sensors may be used for navigational purposes. For example, and without limitation, a user that is walking or jogging could execute a navigation application on a smartphone, and the smartphone could be paired with a force device 100. Accordingly, instead of disrupting the user with visual and/or auditory navigation instructions, the force device 100 could exert pseudo forces (e.g., left linear/rotational forces and right linear/rotational forces) when the user needs to turn down a particular street.

Figure 8A:
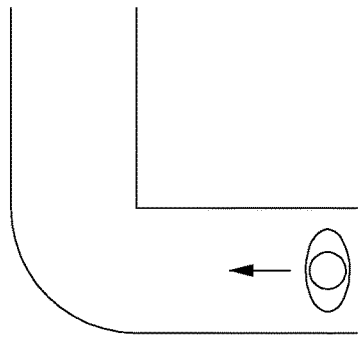
FIGS. 8A-8D illustrate a technique for providing navigational instructions to a user via a force device, according to various embodiments.
Figure 8B:
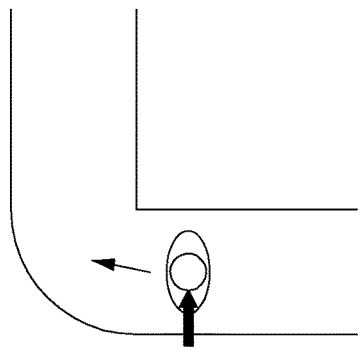
Figure 8C:
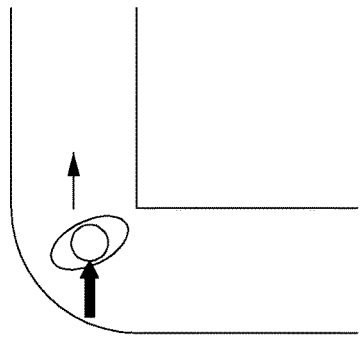
Figure 8D:
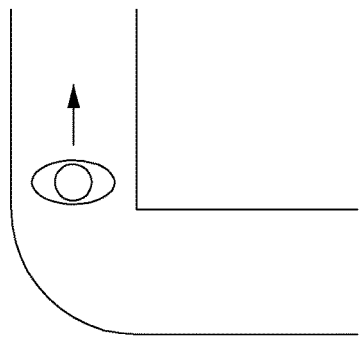

For example, and without limitation, the force device 100 could monitor the position of the user and, when the user needs to turn right, the force device 100 could generate a right linear force to nudge the user's head to the right, as shown in FIG. 8B. Further, as the user is in the process of turning, the sensor(s) could detect the change in the location and orientation of the user, reposition the masses 110 to exert forces of an appropriate direction, and then asymmetrically accelerate one or more masses 110 to continue to direct the user in the correct direction, as shown in FIG. 8C. Then, after turning down the correct street, the force device 100 could stop accelerating the masses 110 and optionally return the masses 110 to a neutral position, as shown in FIG. 8D. In addition, when the user arrives at his or her destination, the force device 100 could generate a specific force pattern to indicate that the user has reached his or her destination.

In some embodiments, various types of force devices 100, such as those described above, could be integrated with a safety device, such as a system that identifies potential dangers in the surrounding environment and issues alerts to warn a user of the potential dangers. In such embodiments, the force device 100 could analyze the user's surroundings via the sensors and detect potential dangers. Then, when the force device 100 detects a dangerous condition, the force device 100 could apply a force to cause the user to turn his or her head towards the dangerous condition, such as a car pulling out of a driveway.

In another non-limiting example, the force device 100 could be integrated with a head-worn surround (e.g., hemispheric) imager that captures a 360° panorama around the user, or any other sensor that captures information associated with the environment surrounding the user. For example, and without limitation, an imager or sensor could identify a bird in a tree located behind the user. The force device 100 could then exert a force (e.g., an up and to the right force via a force device 100 having three linear DoF) on the user to indicate that the user—an avid birder—should direct his or her gaze up and to the right.

In yet another non-limiting example, the force device 100 could be integrated with an augmented reality (AR) head-mounted device (HMD). As a user walks down a street and operates the force device 100, the HMD could display various AR information associated with objects in the surrounding environment. Then, when an object associated with AR information is outside of the user's field of view, the force device 100 could exert a force to direct the user's attention towards the object. For example, and without limitation, the force device 100 could include a GNSS sensor that determines the user is passing by an apartment building with a noteworthy apartment on the third floor. In response, the force device 100 could exert a force instructing the user to direct his or her gaze towards the apartment so that AR information associated with the apartment could be provided to the user.

In yet another non-limiting example, the force device 100 could include gyroscopic sensors, accelerometers, and/or imagers to detect when a user stumbles or loses his or her balance. In such a situation, the force device 100 could exert one or more forces to the head or body of the user to attempt to prevent the user from falling and/or to correct the user's balance. For example, and without limitation, one or more sensors included in the force device 100 may detect that the posture of the user is outside of a threshold range (e.g., an angular range). In response, the force device 100 could exert one or more forces to influence the posture of the user until the posture is back within the threshold range. Additionally, forces could be exerted on the head or body of the user when the force device 100 detects via one or more sensors that the user is about to walk into an object, such as a light pole or fire hydrant.

In some embodiments, the force device 100 could provide alerts for involuntary body movements, commonly referred to as stereotypy, being performed by the user. Stereotypy may include repetitive movements, postures, or utterances, such as body rocking, self-caressing, crossing/uncrossing of legs, and marching in place. Accordingly, gyroscopic sensors, accelerometers, imagers, etc. could be implemented to detect such movements and exert a force to bring the movements to the attention of the user. Additionally, the force device 100 could exert forces to compensate for slight movements of the user's head or body that the user would like to cancel out. In such embodiments, the force device 100 could recognize an involuntary body movement pattern and generate a force pattern having substantially the same magnitude, but opposite phase/direction, in order to cancel out the undesired body movement pattern.

Figure 9:
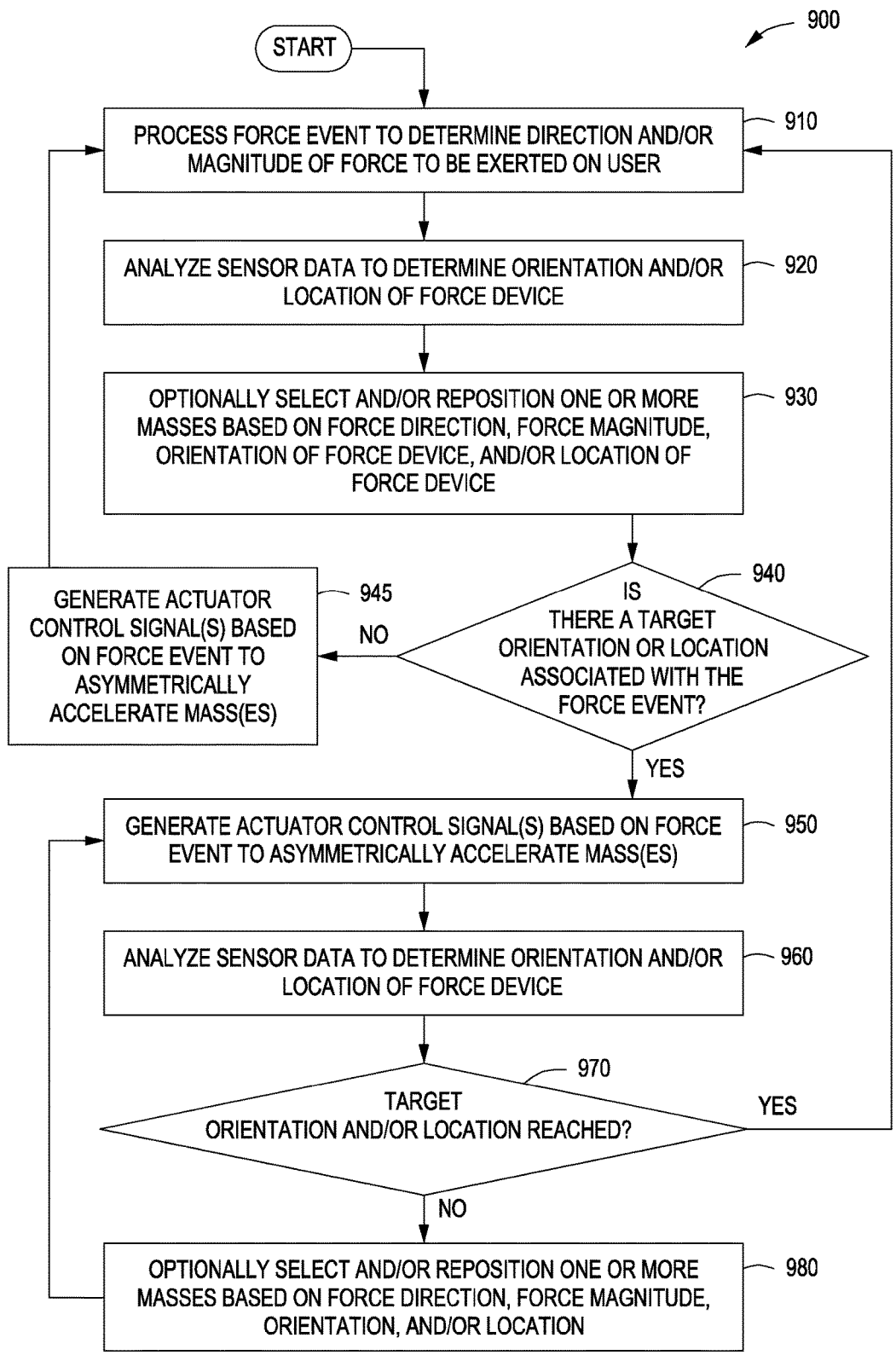
FIG. 9 is a flow diagram of method steps for exerting forces on a user to communicate information to the user, according to various embodiments.

FIG. 9 is a flow diagram of method steps for exerting forces on a user to communicate information to the user, according to various embodiments. Although the method steps are described in conjunction with the systems of FIGS. 1-8D, persons skilled in the art will understand that any system configured to perform the method steps, in any order, falls within the scope of the various embodiments.

As shown, a method 900 begins at step 910, where the force control application 232 receives or generates a force event and processes the force event to determine a force direction, such as a linear force or a rotational force, and/or a force magnitude. As described above, forces of various types and magnitudes may be generated in order to provide instruction, alerts, notifications, etc. to the user. In some embodiments, the force direction indicated by the force event may include a direction relative to the user, or the force direction may include an absolute direction (e.g., based on geographic cardinal directions).

At step 920, the force control application 232 analyzes sensor data to determine the orientation and/or position (e.g., relative coordinates or absolute coordinates) of the force device 100. In various embodiments, the orientation and/or position of the force device 100 may indicate how the mass(es) 110 should be positioned and/or in which directions and distances the mass(es) 110 should be accelerated in order to generate a force having a direction and/or magnitude specified by the force event. For example, and without limitation, at step 920, the force control application 232 may determine a starting position and an ending position between which each of one or more masses 110 should be asymmetrically accelerated and decelerated. Additionally, when the force device 100 includes multiple masses 110, the orientation and/or position of the force device 100 may indicate which masses 110 should be selected and accelerated to generate a force (e.g., a continuous force) having a direction and/or magnitude specified by the force event. Accordingly, at step 930, the force control application 232 optionally selects and/or repositions one or more masses 110 based on the force direction indicated by the force event, the force magnitude indicated by the force event, the orientation of force device 100, and/or the position of force device 100.

Next, at step 940, the force control application 232 determines whether a target orientation or position is specified by the force event. In some embodiments, a target orientation may include a threshold range (e.g., an angular range or distance range) associated with the user's posture, head orientation, body orientation, etc. Additionally, in some embodiments, a target position may include GPS coordinates. If no target orientation or target position is specified by the force event, then the method 900 proceeds to step 945, where the force control application 232 generates one or more actuator control signals to cause the actuators 114 to asymmetrically accelerate the one or more masses 110, causing a singular, periodic, and/or continuous pseudo force to be exerted on the user in accordance with the force event. The method 900 then returns to step 910, where the force control application 232 waits to receive or generate an additional force event.

If, however, at step 940, a target orientation or a target position is specified by the force event, then the method 900 proceeds to step 950, where the force control application 232 generates one or more actuator control signals to cause the actuators 114 to accelerate the one or more masses 110, causing a singular, periodic, and/or continuous pseudo force to be exerted on the user in accordance with the force event. Then, at step 960, the force control application 232 analyzes the sensor data to detect the orientation and/or the position of the force device 100. At step 970, the force control application 232 determines whether the user has complied with and/or properly responded to the pseudo force(s) by determining whether the force device 100 is in the target orientation and/or at the target position.

If, at step 970, the force control application 232 determines that the force device 100 is not in the target orientation and/or not at the target position, then the method 900 proceeds to step 980, where the force control application 232 again optionally selects and/or repositions one or more masses 110 based on the force direction indicated by the force event, the force magnitude indicated by the force event, the orientation of force device 100, and/or the position of force device 100. The method 900 then returns to step 950, where the force control application 232 generates one or more actuator control signals to cause the actuator(s) 114 to asymmetrically accelerate the mass(es) 110 to exert one or more additional forces on the user.

If, however, at step 970, the force control application 232 determines that the force device 100 is in the target orientation and/or at the target position, then the method 900 returns to step 910, where the force control application 232 waits to receive or generate an additional force event.

In sum, the force control application receives or generates a force event indicating a force direction and/or a force magnitude. The force control application then determines, based on sensor data, the orientation and/or the position of the force device. The force control further determines a force to be exerted on the user based on the force event as well as the orientation and/or the position of the force device. Next, the force control application generates one or more actuator control signals to optionally reposition the one or more masses 110 and asymmetrically accelerate the mass(es) 110 in order to exert one or more pseudo forces on the user.

At least one advantage of the techniques described herein is that non-visual and non-auditory information can be provided to a user, thereby preventing the visual and/or auditory channels of the user from being overwhelmed with information. Accordingly, the user can receive instructions, alerts, and notifications via the techniques described herein, while simultaneously receiving other types of information via his or her visual and/or auditory channels, without creating potentially dangerous situations. Further, by offsetting the phases with which different masses are asymmetrically accelerated, pseudo forces can be exerted in a continuous manner on the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for exerting forces on a user, the system comprising:
a user-mounted device including one or more masses disposed along one or more tracks; and
a processor configured to:
generate a first actuator control signal to configure a first actuator to move a first mass included in the one or more masses at a first acceleration in a first direction along a first track included in the one or more tracks,
generate a second actuator control signal to configure at least one of the first actuator and a second actuator to move the first mass at a second acceleration in the first direction along the first track, wherein a magnitude of the first acceleration is above a threshold acceleration, and a magnitude of the second acceleration is below the threshold acceleration, and
generate a third actuator control signal to configure a third actuator to move a second mass included in the one or more masses at a third acceleration in the first direction along a second track included in the one or more tracks, wherein a first portion of the third actuator control signal overlaps the second actuator control signal, and a second portion of the third actuator control signal does not overlap the second actuator control signal.

2. The system of claim 1, wherein the processor is further configured to: generate a fourth actuator control signal to configure at least one of the third actuator and a fourth actuator to move the second mass at a fourth acceleration in the first direction along the second track,
wherein a magnitude of the third acceleration is above the threshold acceleration, and a magnitude of the fourth acceleration is below the threshold acceleration.

3. The system of claim 2, wherein the processor is further configured to:

generate a fifth actuator control signal to configure a fifth actuator to move the first mass at a fifth acceleration in a second direction along the first track, wherein the fifth acceleration is below the threshold acceleration, and generate a sixth actuator control signal to configure at least one of the fifth actuator and a sixth actuator to move a third mass at a sixth acceleration in the first direction along a third track included in the one or more tracks, wherein a magnitude of the sixth acceleration is above the threshold acceleration, and at least a portion of the fifth actuator control signal overlaps at least a portion of the sixth actuator control signal.

4. The system of claim 2, wherein the processor is further configured to:

generate a fifth actuator control signal to configure a fifth actuator to move a third mass included in the one or more masses at a fifth acceleration in a second direction along a third track included in the one or more tracks, wherein the third track is substantially perpendicular to the first track and the second track, and generate a sixth actuator control signal to configure at least one of the fifth actuator and a sixth actuator to move the third mass at a sixth acceleration in the second direction along the third track, wherein a magnitude of the fifth acceleration is above the threshold acceleration, a magnitude of the sixth acceleration is below the threshold acceleration, and at least a portion of the fifth actuator control signal overlaps at least a portion of the first actuator control signal.

5. The system of claim 4, further comprising one or more sensors configured to acquire sensor data, wherein the processor is further configured to:

determine at least one of an orientation and a position associated with the user-mounted device based on the sensor data; and compute a force direction to be exerted on the user via the one or more masses based on at least one of the orientation and the position, wherein the first actuator control signal and the fifth actuator control signal are generated based on the force direction.

6. The system of claim 1, wherein the threshold acceleration corresponds to a minimum acceleration that is perceptible by the user.

7. The system of claim 1, further comprising one or more sensors configured to acquire sensor data, and the processor is further configured to:

determine at least one of an orientation and a position associated with the user-mounted device based on the sensor data; and compute a force to be exerted on the user via the one or more masses based on at least one of the orientation and the position, wherein the first actuator control signal is generated based on the force.

8. The system of claim 7, wherein the one or more sensors comprise at least one of a global navigation satellite system (GNSS) receiver, a magnetometer, an accelerometer, and an optical sensor.

9. The system of claim 7, wherein the user-mounted device comprises a head-mounted device, and the orientation and the position associated with the user-mounted device comprise a head orientation and a head position, respectively.

10. The system of claim 7, wherein the processor is further configured to receive a force event associated with a navigation instruction, and wherein the force to be exerted on the user is further based on a force direction associated with the force event.

11. The system of claim 7, wherein the processor is further configured to compute a starting position of the first mass along the first track and an ending position of the first mass along the first track based on at least one of the force, the orientation, and the position.

12. The system of claim 1, wherein at least one of the first actuator and the second actuator comprises at least one of a first spring that is proximate to a first end of the first track and a second spring that is proximate to a second end of the first track.

13. The system of claim 1, wherein at least one of the first actuator and the second actuator comprises one or more magnets disposed along the first track.

14. The system of claim 1, wherein the user-mounted device comprises at least one of a shoulder-mounted device, an arm-mounted device, a hand-mounted device, and a leg-mounted device.

15. A non-transitory computer-readable storage medium including instructions that, when executed by a processor, configure the processor to exert forces on a user, by performing the steps of:

generating a first actuator control signal to configure a first actuator to move a first mass at a first acceleration in a first direction along a first track;

generating a second actuator control signal to configure at least one of the first actuator and a second actuator to move the first mass at a second acceleration in the first direction along the first track, wherein a magnitude of the first acceleration is above a threshold acceleration, a magnitude of the second acceleration is below the threshold acceleration, and the threshold acceleration corresponds to a minimum acceleration that is perceptible by the user, and generating a third actuator control signal to configure a third actuator to move a second mass included in the one or more masses at a third acceleration in the first direction along a second track included in the one or more tracks, wherein a first portion of the third actuator control signal overlaps the second actuator control signal, and a second portion of the third actuator control signal does not overlap the second actuator control signal.

16. The non-transitory computer-readable storage medium of claim 15, further comprising: generating a fourth actuator control signal to configure at least one of the third actuator and a fourth actuator to move the second mass at a fourth acceleration in the first direction along the second track, wherein a magnitude of the third acceleration is above the threshold acceleration, and a magnitude of the fourth acceleration is below the threshold acceleration.

17. The non-transitory computer-readable storage medium of claim 16, further comprising:

generating a fifth actuator control signal to configure a fifth actuator to move the first mass at a fifth acceleration in a second direction along the first track, wherein the fifth acceleration is below the threshold acceleration; and generating a sixth actuator control signal to configure at least one of the fifth actuator and a sixth actuator to move a third mass at a sixth acceleration in the first direction along a third track included in the one or more tracks;

wherein a magnitude of the sixth acceleration is above the threshold acceleration, and at least a portion of the fifth actuator control signal overlaps at least a portion of the sixth actuator control signal.

18. The non-transitory computer-readable storage medium of claim 15, further comprising:
acquiring sensor data via at least one of a global navigation satellite system (GNSS) receiver, a magnetometer, an accelerometer, and an optical sensor;
determining at least one of an orientation and a position associated with the system based on the sensor data; and
computing a force to be exerted on the user via the one or more masses based on at least one of the orientation and the position,
wherein the first actuator control signal is generated based on the force.

19. The non-transitory computer-readable storage medium of claim 15, wherein at least one of the first actuator and the second actuator comprises one or more magnets disposed along the first track, and at least one of the first actuator control signal and the second actuator control signal comprises an electromagnet signal.

20. A method for exerting forces on a user, the method comprising:
generating a first actuator control signal to configure a first actuator to move a first mass at a first acceleration in a first direction along a first track;
generating a second actuator control signal to configure at least one of the first actuator and a second actuator to move the first mass at a second acceleration in the first direction along the first track;
generating a third actuator control signal to configure a third actuator to move a second mass at a third acceleration in the first direction along a second track; and
generating a fourth actuator control signal to configure at least one of the third actuator and a fourth actuator to move the second mass at a fourth acceleration in the first direction along the second track,
wherein a magnitude of the first acceleration is above a threshold acceleration, a magnitude of the second acceleration is below the threshold acceleration, a magnitude of the third acceleration is above the threshold acceleration, a magnitude of the fourth acceleration is below the threshold acceleration, and at least a portion of the third actuator control signal overlaps at least a portion of the second actuator control signal.

* * * * *